United States Patent [19]

Yosim et al.

[11] 3,899,322

[45] Aug. 12, 1975

[54] NOBLE-TYPE METAL RECOVERY PROCESS BY USE OF MOLTEN SALT BATH

[75] Inventors: Samuel J. Yosim, Woodland Hills; LeRoy F. Grantham, Calabasas, both of Calif.

[73] Assignee: Rockwell International Corporation, El Segundo, Calif.

[22] Filed: May 16, 1973

[21] Appl. No.: 361,380

Related U.S. Application Data

[63] Continuation-in-part of Ser. No. 264,681, June 20, 1972, abandoned.

[52] U.S. Cl. .................. 75/65 R; 75/83; 134/2; 134/38
[51] Int. Cl.² .. C22B 9/10; C22B 11/00; C23G 1/34
[58] Field of Search ....... 75/65 R, 83, 93 A, 93 AC, 75/93 R, 93 AD; 134/2, 38

[56] References Cited
UNITED STATES PATENTS

| | | | |
|---|---|---|---|
| 1,415,526 | 5/1922 | Chikashige et al. | 75/83 |
| 2,338,673 | 1/1944 | Slack | 134/38 X |
| 2,342,102 | 2/1944 | Clare | 75/93 |
| 2,538,702 | 1/1951 | Noble et al. | 134/3 |
| 3,000,766 | 9/1961 | Wainer | 134/38 X |
| 3,417,166 | 12/1968 | Foster | 75/65 X |
| 3,448,702 | 6/1969 | McLouth | 75/65 X |
| 3,567,412 | 3/1971 | Lefrancois et al. | 48/202 |
| 3,615,815 | 10/1971 | Wainer | 134/2 |
| 3,671,222 | 6/1972 | Johnson | 75/83 |
| 3,697,257 | 10/1972 | Perry | 75/64 |
| 3,770,501 | 11/1973 | Kemper | 134/38 X |

FOREIGN PATENTS OR APPLICATIONS
737,616 9/1955 United Kingdom.................. 134/38

*Primary Examiner*—Allen B. Curtis
*Assistant Examiner*—Thomas A. Waltz
*Attorney, Agent, or Firm*—L. L. Humphries; Henry Kolin

[57] ABSTRACT

Valuable metals are recovered from scrap containing metal values with substantially reduced emission of environmental pollutants by feeding the metal-value-containing scrap and a source of oxygen into a molten salt preferably at a temperature above the melting point of the metal, the molten salt containing an alkali metal carbonate and preferably also an alkali metal sulfate, to pyrolytically decompose the scrap and form recoverable metal. Organic material present in the scrap is combusted. The scrap decomposition products react with and are retained in the melt. Undesired gaseous decomposition products that are formed are suitably eliminated by being passed through the melt to a second reaction zone where oxidation of any combustible matter present is completed. Certain organic scrap materials may be completely combusted in the first reaction zone by using an excess of oxygen or air in this zone during the decomposition reaction, thereby obviating the need for a second reaction zone. Thereby the final gases vented to the atmosphere as a result of oxidative treatment in only the first zone or in both zones include only such gases as carbon dioxide, water vapor, oxygen and nitrogen.

10 Claims, 1 Drawing Figure

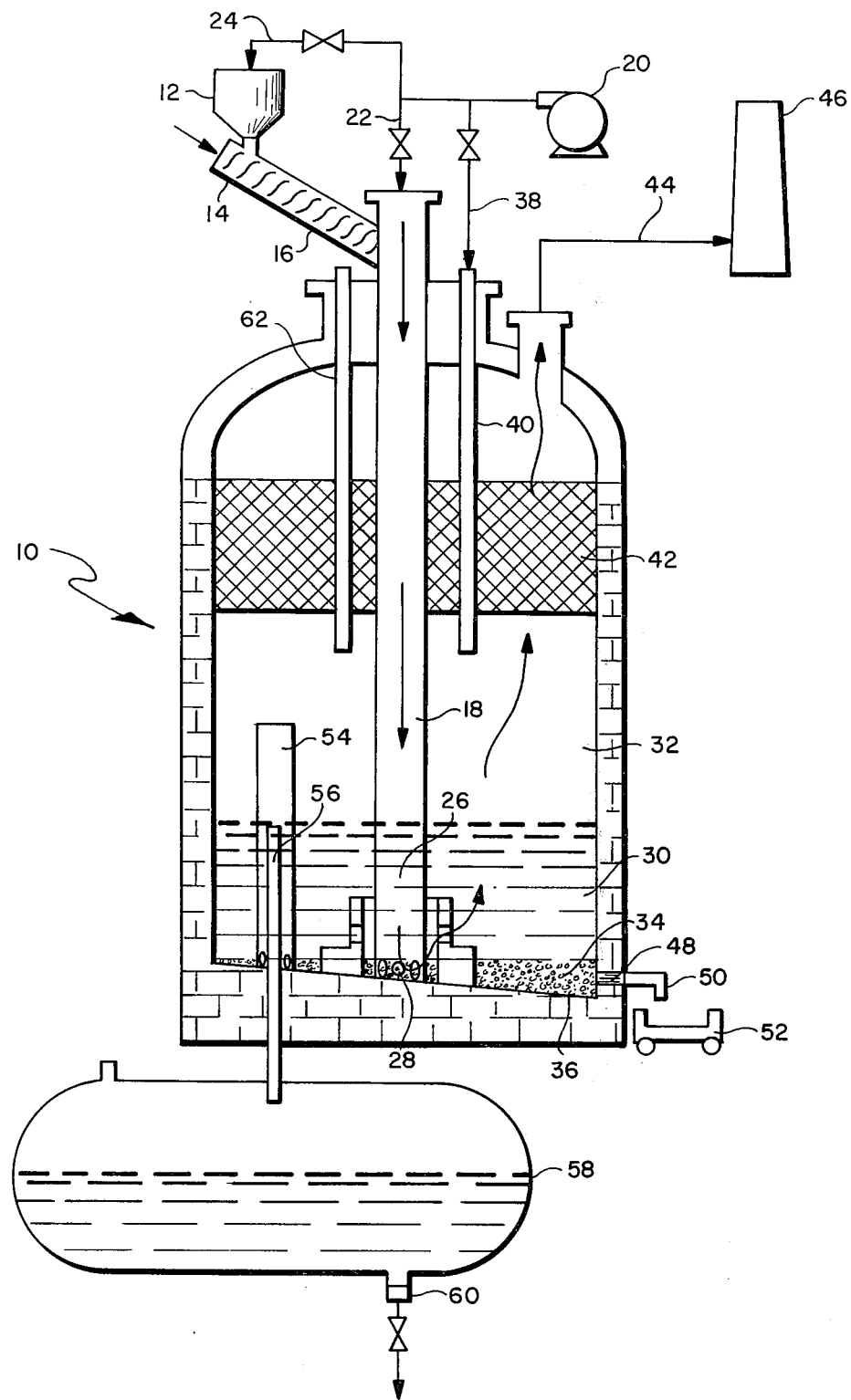

NOBEL-TYPE METAL RECOVERY PROCESS BY USE OF MOLTEN SALT BATH

CROSS REFERENCES TO RELATED APPLICATIONS

This application is a continuation-in-part of application Ser. No. 264,681 filed June 20, 1972 and since abandoned.

BACKGROUND OF THE INVENTION

This invention relates to the recovery of metal values from waste or scrap materials. It particularly relates to a molten salt process for recovering metal from metal-value-containing scrap which results in substantially reduced emission of environmental pollutants.

Valuable metals are incorporated in such useful devices as electrical equipment, cables, conduits, fittings, containers, photographic film and a host of other end items. When the end item has served its useful life or has become technologically obsolete, it is often scrapped as waste material principally because of the difficulty of recovering the metal economically, particularly by a pollution-free method. This is particularly true when the metal is in the form of small pieces of wire or armored cable or small parts coated with lacquers, paints, rubber, plastics or other organic materials, or glass wool, enamel or ceramic coatings. Or the metal may be physically intermixed with considerable quantities of organic waste materials. Or the metal may be present in chemically combined or elemental dispersed form as is the cae with photographic film containing silver values.

While several metal-recovery methods have been proposed and utilized, these methods have presented various drawbacks with respect to cost, limitations with respect to material treated, or the creation of other problems such as environmental pollution by their use. Thus, one prior art approach to the recovery of metals have been a burning and melting operation in which the scrap material is charged into a metallurgical-type furnace. The combustibles burn first, as the charged material is heated, usually with a copious evolution of black smoke. Inorganic contaminants must be fluxed to insure separation of the metal, and this represents an added economic disadvantage to the process. In addition, after the coating materials have been burned off, recovery of the metal frequently presents a difficult separation problem.

Until recently, most copper was reclaimed from insulated copper wire by burning the insulation. This practice results in serious air pollution problems because of the combustion of the polyvinyl chloride insulation. In addition, much of the copper is converted to the oxide. Similarly, in the recovery of silver from silver-containing waste such as batteries, photographic film, sensitized paper, and printed circuit boards, the organic material is burned in a combustible atmosphere to form an ash. The air pollution problems associated with such a treatment are substantial. Illustrative of known silver recovery processes are those shown in U.S. Pat. Nos. 2,131,072; 2,218,250; 2,944,886; and 3,632,336.

It has also been suggested that fused salt baths be used as a means for removing the various organic and inorganic coating materials commonly found associated with the scrap metal. Thus the use of baths containing caustic, carbonates, nitrites or nitrates, and mixtures of such salts have been shown in U.S. Pat. Nos. 528,156; 1,714,879; 2,395,694; 2,458,660; 2,458,661; 3,000,766; and 3,615,815. In some instances, solid oxidizing substances or steam has been proposed for use with these baths as shown in U.S. Pat. Nos. 2,538,702; 2,630,393; and 1,829,693.

SUMMARY OF THE INVENTION

It is an object of the present invention to provide a simple, rapid, and non-polluting process, free from the drawbacks characterizing known processes, for the recovery of valuable metals from scrap containing metal values.

It is a further object to recover the metal in high purity in the molten state, readily solidifiable to a compact ingot.

In accordance with the broad aspects of the present invention, the metal-value-containing scrap and a source of oxygen, suitably and preferably air, are fed into a first reaction zone characterized as a pool of a molten salt mixture maintained at a temperature between 400° and 1,800°C, preferably between 800° and 1,800°C, and consisting essentially of only an alkali metal carbonate or mixture of alkali metal carbonates, or preferably consisting essentially of a major portion, i.e., more than 50 wt.%, of an alkali metal carbonate and a minor portion of at least 1 wt.% of an alkali metal sulfate. In its preferred aspects, the bath is maintained at a temperature above the melting point of the metal so that the waste organic and inorganic materials associated with the recoverable metal are pyrolytically decomposed, accompanied by partial or substantially complete combustion, or simply dissolved to form scrap decomposition products and a pool of molten metal. The scrap decomposition products are retained in the molten salt melt or emitted as combustible or completely combusted gaseous products, while the molten metal is separately recovered.

Where the non-metallic scrap portion principally contains organic materials, which is frequently the case, the formed decomposition products generally include a gaseous effluent. Where excess air is passed into the melt during the thermal treatment of certain organic-containing scrap materials, substantially complete combustion of the organic material is obtainable in the melt. The evolved gases from this first treatment zone then include only the formed carbon dioxide and water vapor, and also oxygen and nitrogen from the air. However, where combustible matter is present in the gaseous effluent, to provide further reduced emission of environmental pollutants it is preferred that the gaseous effluent be further treated in a secondary combustion zone. This is readily accomplished by passing the gaseous effluent, which may carry entrained carbonaceous particulate matter, through the molten salt pool into a second reaction zone where combustible gases or any combustible matter present in these gases is further oxidized. Thereby the final gaseous effluent vented to the atmosphere from either the first or the second reaction zone consists essentially only of gases such as carbon dioxide, water vapor, oxygen and nitrogen. Other decomposition products formed are retained in the melt. These are minimal where excess oxygen is initially used and the non-metallic scrap portion consists only of organic matter. The molten metal is removed from the bottom of the molten salt pool.

Where the molten salt is maintained at a temperature below the melting point of the recoverable metal, then the manner of recovery of the metal is determined in part by its structural integrity. Thus an insulated reel or coil of copper wire treated in the molten salt at a temperature below the melting point of copper, but at a temperature sufficient to decompose the organic insulating material, will be obtained in its original structural form but stripped of insulation. However, photographic film treated in the molten salt pool maintained at a temperature below the melting point of silver will be recovered from the molten salt pool as finely divided particulate matter. This recovered metal is then filtered from the salt melt, the filter cake then being heated to convert the recovered particulate matter to the molten state. Such a method is suitable for both silver and copper recovery. Carbonaceous particulate matter that may be present in the filter cake is converted to carbon dioxide during melting of the metal.

In the preferred aspects of this process, the molten salt mixture is maintained in the molten state at a temperature above 850°C and slightly above the melting point of the recoverable metal, the salt mixture consisting essentially of sodium carbonate containing from about 1 to 25 wt.% sodium sulfate. An amount between 5 and 15 wt.% sodium sulfate is particularly preferred. Where only partial combustion of organic matter takes place in the first reaction zone, then in order to complete oxidation of this combustible matter, which may include a minimal amount of carbonaceous particulate matter as well as gases that are further oxidizable, it is fed from the first reaction zone to the second reaction zone. A second source of oxygen, preferably air, is also fed into the second reaction zone. A metal mesh, e.g., stainless steel, or a ceramic-coated metal mesh, e.g., aluminized or alumina-coated stainless steel, is preferably present at least in this second zone to serve as a source of ignition and also to demist the gaseous effluent of any particles of the molten salt mixture present in its prior to venting this effluent to the atmosphere.

Depending upon the nature of the decomposition products of the metal-containing scrap that are retained in the melt, it is preferable and frequently required that the melt be further treated so as to be non-toxic and non-contaminating when ultimately disposed of in a body of water or in the soil. The melt containing the retained decomposition products is treated with air to oxidize any residual sulfide to sulfate, and then may be recovered for reprocessing by treatment with lime, or may be disposed of in a dry lake bed or in a soil pit. Where the melt predominantly contains chlorides such as sodium chloride resulting from the decomposition of polyvinyl chloride insulation, the entire residue may be used as a raw material for brine utilization or may be directly disposed of into a large body of water such as the ocean.

A wide variety of metals recoverable in molten metal form may be rapidly and conveniently obtained from metal-containing scrap and waste materials, whether in free metal or combined form, by the present process with relatively minor modification in treatment techniques because the process basically involves the treatment of the metal-containing scrap in the molten salt bath in the presence of oxygen at an elevated temperature preferably above the melting point of the metal. This results in rapid decomposition and dissolution of associated organic and inorganic materials. Where incomplete combustion occurs, then preferably this thermal decomposition is followed by further combustion of effluent decomposition products. The present process is particularly suitable for the recovery of valuable metals in molten metal form, readily solidifiable to a compact ingot, of those relatively inert or noble metals having a melting point below 1,800°C: the IB metals, namely, copper, silver, and gold; the platinum family metals palladium and platinum; and aluminum. Although aluminum is not ordinarily classified as a noble metal because of its chemical reactivity, in accordance with the present invention the reaction may be controlled so that aluminum does not react with the components of the molten salt to form a soluble aluminum salt. Instead it forms a molten pool of aluminum from which metallic aluminum is readily recovered as aluminum ingots. Thus its behavior with respect to the present invention may be characterized as that of a pseudonoble metal. Accordingly, the term noble-type metals will be used herein to mean the hereinbefore-enumerated metals, namely, copper, silver, gold, palladium, platinum, and aluminum.

The present invention will be particularly illustrated with respect to the reclamation of copper from insulated copper wire and the recovery of silver from photographic film because of their commercial inportance. Thus the stripping of copper wire salvaged from buildings marked for destruction and the recovery of silver from photographic operations represents a multimillion dollar industry in the United States.

While it is not intended to limit the practice of the present invention by the proffered explanation, it is believed that the present molten salt process for the recovery of metal from metal-containing scrap, particularly in its preferred aspects utilizing an alkali carbonate melt containing alkali metal sulfate, is effective in the following manner. When the scrap material is reacted at a temperature slightly above the melting point of the metal, illustratively and preferably between 1,000° and 1,100°C for the recovery of silver, between 1,100° and 1,200°C for the recovery of copper, and between 850° and 950°C for the recovery of aluminum, with a sodium carbonate melt containing preferably from about 1 to 25 wt.% sodium sulfate in the presence of a source of oxygen, several reactions occur. The initial reaction, where organic waste material is present with the metal and only a limited supply of air is used, is that of pyrolysis and partial oxidation by the sulfate in the melt to form char, combustible gases such as hydrocarbons and carbon monoxide, and acidic gases such as sulfur dioxide and hydrogen chloride. The acidic gases are instantly neutralized by the alkaline salt and retained in the melt. The combustible gases plus any unreated carbonaceous particulates are consumed in a second reaction zone. The char remains in the sulfate-containing melt in the first zone until completely consumed by reaction with sulfate. In the above reaction sequence, the reaction of char with the sodium sulfate is an endothermic one to form sodium sulfide. The sodium sulfate is simultaneously regenerated in an exothermic reaction by reacting a source of oxygen such as air with the dissolved sodium sulfide. The following reactions take place:

$$Na_2SO_4 + 2C \rightarrow Na_2S + 2CO_2 \text{(endothermic)}$$

$$Na_2S + 2O_2 \rightarrow Na_2SO_4 \text{(exothermic)}$$

where C represents the carbonaceous portion of the organic material, or the char. The net reaction $C + O_2 \rightarrow CO_2$ being an exothermic one, the desired high reaction temperature above the melting point of the metal being recovered may be maintained. That an exothermic reaction occurs when sulfide is converted to sulfate is known. Such a reaction is utilized for example in U.S. Pat. No. 3,567,412 where a portion of a carbonaceous material is combusted so as to provide heat for a gasification reaction by using an oxidizing agent in the presence of sulfate. This reaction is also essentially utilized in U.S. Pat. No. 3,708,270 in a method of pyrolyzing carbonaceous materials and in U.S. Pat. No. 3,710,737 in a method of generating heat and consuming carbonaceous materials.

While the net overall reaction that occurs is the oxidation of the char, the combination of the oxygen and carbon occurs indirectly in that each component reacts separately with a component present in the molten salt, as shown above. While the sodium carbonate essentially does not take part in the chemical reactions shown above, it provides a compatible salt medium at practical operating temperatures and, in addition, provides heat for initiating pyrolysis and combustion as well as reacting with acidic pollutants. Thus it uniquely provides a highly effective non-contaminating, stable thermal decomposition medium, particularly where excess air is fed to the system. In the presence of excess air, i.e., containing sufficient oxygen for complete combustion of all organic matter present, the molten salt medium appears to promote direct reaction in the melt of the organic thermal decomposition products with the oxygen so that complete combustion occurs rapidly within the melt. Thus in the present process, the ultimate gaseous products evolved are $H_2O$ and $CO_2$. $N_2$ is also evolved where the source of oxygen used is air. Excess oxygen is also present.

Where metal wire covered with a chlorinated polymeric insulation constitutes the metal-containing scrap being treated, sodium chloride is formed in the melt. Where organic phosphate compounds are present in the scrap, sodium phosphates are formed. Where sulfur is present in the waste material, sodium sulfate will be produced. All of these formed inorganic compounds are retained in the melt.

When the capability limit of the salt to react with the waste material has been reached, the salt is removed and fresh make-up salt is added. The spent salt is recovered or otherwise disposed of. Where silver is recovered from undeveloped photographic film, bromides and iodides accumulate in the melt. These materials are recoverable from the spent melt by blowing chlorine through the melt or through an aqueous solution of the melt to form elemental bromine and iodine.

BRIEF DESCRIPTION OF THE DRAWING

The sole FIGURE of the drawing shows a schematic illustration of a preferred embodiment of apparatus for practicing the process of this invention.

DESCRIPTION OF THE PREFERRED EMBODIMENTS

In the broadest aspects of the present invention, metal is recovered from metal-containing scrap by dissolving associated inorganic waste material and thermally decomposing associated organic waste material at an elevated temperature preferably above the melting point of the metal in the presence of a source of oxygen utilizing as reaction medium a molten salt containing an alkali metal carbonate and an alkali metal sulfate. Some of the decomposition products are retained in the molten salt while others, such as combustible gases, are further oxidized. Where the oxygen is supplied in excess, and only organic matter is present, as in completely developed photographic film, then complete oxidation of combustible gases occurs at the time of thermal decomposition, with little or no retention of decomposition products in the molten salt.

When it is desired to maintain the molten salt at a temperature below the melting point of the recoverable metal or to recover a metal melting at a relatively low temperature, a low-melting binary or ternary mixture of alkali metal carbonates may be utilized, preferably together with the alkali metal sulfate. Thus the ternary alkali metal carbonate eutectic melts at 395° ± 1°C and consists of 43.5, 31.5, and 25.0 mole percent of the carbonates of lithium, sodium, and potassium, respectively. The $K_2CO_3$-$Na_2CO_3$ eutectic has a melting point of 710°C. While the alkali metal sulfate utilized may consist of any of the sulfates of the foregoing alkali metals, in general, sodium sulfate is preferred because of its convenience and low cost.

Because of the importance of having a convenient, rapid, and effective method of economic interest for recovering molten metals such as copper and silver from metal-containing scrap, the present invention will be particularly described with reference to such a preferred recovery process for copper and silver utilizing a molten salt consisting essentially of sodium carbonate containing from 1 to 25 wt.% sodium sulfate in the presence of oxygen at a temperature slightly above the melting point of silver (961°C) and/or copper (1083°C) and preferably further utilizing a plurality of zones for effecting complete combustion and ultimate disposal of the waste products formed.

Referring to the drawing, a refractory-lined metal recovery furnace 10 is shown. Small, suitably sized pieces of the metalcontaining scrap contained in a feed hopper 12 attached to an auger-type screw conveyor 14 are fed by way of a conduit 16 to a first zone 18 of furnace 10. Alumina is a suitable material of construction for this zone. At the same time a stream of air from a blower 20 is fed by way of a valved conduit 22 to zone 18. Air is also fed by way of a valved conduit 24 to hopper 12 so as to prevent any back pressure through conduit 16 due to evolved gases formed during the thermal decomposition or combustion reaction. The scrap and the air stream impinge upon a pool 26 of molten salt disposed in the bottom of zone 18. Preferably this molten salt pool consists of molten sodium carbonate containing from 1 to 25 wt.% sodium sulfate. The thermal decomposition reaction is effectively and preferably accomplished in this pool at a temperature above 800°C at which the salt is molten and about 20° to 30° above the melting point of the metal to be recovered. Substantially higher temperatures afford no additional advantages beyond a possible faster rate for the reduction reaction and result in unnecessary waste of generated heat.

Because of the exothermic reaction occurring, sufficient heat is internally generated to maintain the salt in the molten state. At the same time, partial or complete oxidation of organic matter present occurs, depending on the nature of the scrap material and the amount of air fed with the scrap to zone 18. The carbonaceous products formed and the gases evolved because of the decomposition reaction bubble through the molten salt, acidic gases present being immediately neutralized. The molten metal formed is heavier than the molten salt and sinks to the bottom of the vessel. Most of the carbonaceous material formed is consumed in molten salt pools 26 and 30, which freely intermix, by reaction with the sodium sulfate therein to form carbon dioxide and sodium sulfide. The effluent gases, which also generally contain carbonaceous particulate matter, bubble through openings 28 at the bottom of zone 18 into pool 30 of molten salt which also constitutes part of zone 18 because of the intermixing of these pools. The molten metal formed also passes through openings 28 and collects in a molten metal pool 34 on the bottom surface 36, which is preferably sloped, of furnace 10. Completion of combustion of combustible gases evolved from pool 30 takes place in a second reaction zone 32. A stream of air is fed by way of a valved conduit 38 to a tube 40 communicating with second reaction zone 32. For some applications tube 40 may be extended below the surface of the melt in pool 30 to cool the molten salt and at the same time preheat the air so that more rapid combustion occurs in zone 32. A corrosion-resistant metal wire mesh 42, suitably an aluminized or alumina-coated stainless steel mesh, is contained within reaction zone 32 and serves to promote combustion of oxidizable gases and at the same time demist any molten salt particles carried to this point from the gas stream. The effluent gases are removed from furnace 10 by way of a conduit 44 and evolved to the atmosphere by a stack 46. The evolved gases consist essentially of carbon dioxide and water vapor, formed by combustion, and oxygen and nitrogen present from the air. The molten metal is conveniently removed from furnace 10 by way of a knock-out plug 48 leading to a conduit 50 feeding into a metal-collecting ingot car 52.

The present process may be operated as a batch, semicontinuous, or a continuous operation. In furnace 10, means have been provided suitable for continuous operation. An overflow chamber 54 is provided with a level regulator tube 56 so that as the liquid level is increased because of the presence of added scrap material and the reaction products formed, excess molten salt will be drained from the overflow chamber 54 by way of level regulator tube 56 into a soil pit (not shown) where it is solidified. The salt is then removed by a scoop conveyor for further disposal. Alternatively, the spent molten salt is treated with air to oxidize any residual sulfide to sulfate, and then the molten salt is drained into a body of water contained in a receiving vessel 58. The spent salt solution in vessel 58 is then drained by way of a valved exit tube 60 for further processing and ultimate disposal. Also, in order to maintain the process in a continuous manner, additional sodium carbonate and sodium sulfate is conveniently added by way of hopper 12 in admixture with added scrap. Alternatively, additional salt is added to the molten pool in zone 18 by way of a tubular conduit 62.

The following examples illustrate the practice of the invention but are not intended to unduly limit its generally broad scope.

EXAMPLE 1

Scrap copper (0.6 kg) consisting of pieces of 10- and 12- gage insulated copper wire, the insulation consisting of polyvinyl chloride containing alumina and pigment coloring agents, was added to a 4.5-kg molten salt bath contained in an alumina-lined combustion unit at a temperature of 1,100°C. Air was bubbled through the melt by means of a separate tube. The bath, consisting of 80 wt.% $Na_2SO_4$ – 20 wt.% $Na_2CO_3$, completely decomposed and dissolved the insulation. At the bottom of the molten salt bath, a molten pool of copper formed, which was sampled several times over a 2-hour period. The height of the copper pool, which remained constant with time, and its metallic luster showed that little or no oxidation of the copper in the melt was occurring.

EXAMPLE 2

Several pieces (300 grams) of several different sources of scrap copper (i.e., insulated braided wire, insulated No. 9 and No. 12 gage wire, and copper turnings) were placed in 370 grams of 80% $Na_2CO_3$–20% $Na_2SO_4$ melt at 1,100°C in an alumina-lined combustion unit. Air was bubbled through the melt by means of a separate tube. The insulation was rapidly removed from the copper scrap by the melt within a few minutes, and a pool of molten copper formed at the bottom of the molten salt bath. About one hour after start of the test, the molten salt and the molten copper were solidified and recovered as a salt-copper ingot. The copper was readily separated from the solid salt mixture. Approximately 99% of the copper was recovered.

EXAMPLE 3

Strips of scrap aluminum were added in a stream of air through a centrally located feed tube to an 80% $Na_2SO_4$–20% $Na_2CO_3$ melt at 900°C in an alumina-lined combustion unit. The aluminum did not react with the molten salt bath but instead melted and formed a pool at the bottom of the salt melt, the aluminum surface being protected by a thin corrosion-resistant film of aluminum oxide that was formed. At 900°C, the aluminum appeared quite non-reactive, and a sample of molten aluminum was readily recovered from the system. When the temperature was increased in another test to 1,100°C using 115 grams of aluminum scrap containing 0.5 wt.% magnesium, molten aluminum samples were also obtained. However, it was noted that at the more elevated temperature, control of both temperature and melt composition was needed to reduce the oxidation rate of the aluminum and also to prevent an undesired rapid increase in temperature.

EXAMPLE 4

Silver was recovered as molten metal ingots of "precious grade" silver from industrial X-ray film by combusting the film in a molten salt contained in an alumina-lined combustion unit. The combustion unit consisted of a long, round-bottom 99.9% alumina tube contained in a thick-walled stainless steel tube, the assembly being placed within a large clam-shell furnace. Provision was made for the injection of air into the melt contained in the alumina tube. The melt consisted of 20 wt.% $Na_2SO_4$– 80 wt.% $Na_2CO_3$ maintained at a temperature of about 1100°C throughout the series of tests.

The pieces of film that were fed through the feed tube to the combustion chamber were enclosed in their paper wrappers, which were also combusted. The primary off-gas obtained was high in hydrocarbons and carbon monoxide and was burned in a secondary combustion unit to produce a clean waste gas. Very little nitrogen oxides (less than 100 ppm) were found in the off-gas. Smooth combustion was observed in all cases. Molten silver was extracted from the melt at the conclusion of each test. After the solidified silver ingots were washed to remove associated salt, the silver was weighed and analyzed to determine recovery and purity. Some unrecovered silver was present in the melt.

Ingot samples of the silver were analyzed for impurities by emission spectrometry. The results of these analyses and comparison with "precious grade" silver show that the silver obtained is 99.9% pure and essentially equivalent to that of precious grade silver.

The results obtained are summarized in Table I.

TABLE I

TEST CONDITIONS AND RESULTS
FROM SILVER RECOVERY EXPERIMENTS

| Test No. | Approx. Film Feed Rate (gm/min) | Nature of Feed Material | Silver (gm) | Recovery* (wt.%) | Purity of Silver |
|---|---|---|---|---|---|
| 1 | 100 | Cut ½-sheets of X-ray film | 50 | 75 | 99.98+ |
| 2 | 50 | Cut ¼-sheets of X-ray film | 25 | 65 | Not Analyzed |
| 3 | 150 | Rolled ½-sheets of x-ray film | 106 | 62 | Not Analyzed |

*Based on weight of metal recovered as ingot; additional metal was present in the melt but not listed as recovered.

EXAMPLE 5

A batch run was made involving the pyrolysis and combustion of rolls of developed photograph film. The molten salt used was a ternary eutectic melt of the carbonates of sodium lithium, and potassium which contained 10 wt.% sulfate. The molten salt was contained in a 6 inch I.D. test unit, the total weight of salt being 12 pounds and the salt depth 6 inches. Air was fed into the melt at a rate of 2.3 std cu ft/min. Decomposition of the film occurred at the temperatures of the run. The results of the run showed that finely divided elemental silver was dispersed in the salt. The carbon consumption was relatively low at 600°C, but became high enough to give suitable combustion rates at 700°C (equivalent to the fixed carbon in about 0.3 lb of film/hr at 600°C and 1.6 lb of film/hr at 700°C).

The present process is considered to make feasible the recovery of valuable metals, particularly copper and silver, in pure ingot form in a continuous manner from a wide variety of scrap materials. It will of course be realized that many variations in reaction conditions may be used in the practice of this invention, within the limits of the parameters set forth, depending upon the scrap material being processed, the melting point of the metal to be recovered, the temperature required for complete pyrolysis accompanied by partial or complete combustion of the scrap material as well as for recovery of the metal in molten form or as unmelted metal particulates in the salt, and the desired rate of feed of scrap material and of oxygen to the system.

Thus, while the examples illustrating this invention have been described with respect to specific concentrations, temperatures, feed rates, and other reaction conditions, and what is now considered to represent its best embodiment has been illustrated and described, the invention may be otherwise practiced within the scope of the teachings set forth, as will be readily apparent to those skilled in this art. Accordingly, this invention is not to be limited by the illustrative and specific embodiments thereof, but its scope should be determined in accordance with the claims thereof.

We claim:

1. A process for the separation and recovery of a noble-type metal selected from the group consisting of copper, silver, gold, palladium, platinum, and aluminum from scrap containing such metal values, said scrap including at least some organic combustible material, said process being performed under conditions resulting in substantially reduced emission of environmental pollutants, comprising:

feeding said noble type-metal-value-containing scrap and a source of uncombined gaseous oxygen into a pool of a molten salt consisting essentially of sodium carbonate containing about 1 to 25 wt.% sodium sulfate at a temperature between 800° and 1,800°C and above the melting point of said noble-type metal to thermally decompose the scrap to form separable scrap decomposition products and said metal, and separately recovering said metal in molten form free from said scrap decomposition products, the process being so controlled so that the final gaseous effluent vented to the atmosphere consists essentially only of gases selected from carbon dioxide, water vapor, oxygen, and nitrogen.

2. The process of claim 1 wherein molten copper is recovered, the temperature of the molten salt bath being between about 1,100° and 1,200°C.

3. The process of claim 1 wherein molten silver is recovered, the temperature of the molten salt bath being between about 1,000° and 1,100°C.

4. The process of claim 1 wherein molten aluminum is recovered, the temperature of the molten salt bath being between about 850° and 950°C.

5. The process of claim 1 wherein:

the noble-type-metal-value-containing scrap and the source of uncombined gaseous oxygen are fed into said molten salt pool contained in a first reaction zone at a temperature above the melting point of the metal wherein said scrap is pyrolytically decomposed to form a pool of molten metal and said scrap decomposition products which include a gaseous effluent, said gaseous effluent is passed through said molten salt pool into a second reaction zone in the presence of a source of uncombined gaseous oxygen to complete oxidation of any combustible matter present in said effluent, and a final gaseous effluent product consisting essentially only of gases selected from carbon dioxide, water vapor, oxygen, and nitrogen is vented to the atmosphere from said second zone, the remaining decomposition products being retained in the molten salt melt, and the molten metal is separately recovered.

6. The process of claim 5 wherein a corrosion-resistant metal mesh in said second reaction zone provides a surface for ignition and complete oxidation of combustible matter in said second reaction zone, said metal mesh also serving to demist particles of the molten salt mixture present in the gaseous effluent prior to venting of said effluent to the atmosphere.

7. The process of claim 5 wherein molten copper is recovered, the temperature of the molten salt bath being between 1,100° and 1,200°C.

8. The process of claim 5 wherein molten silver is recovered, the temperature of the molten salt bath being between about 1,000° and 1,100°C.

9. The process of claim 5 wherein molten aluminum is recovered, the temperature of the molten salt bath being between about 850° and 950°C.

10. A process for the separation and recovery of a noble-type metal selected from the group consisting of copper, silver, gold, palladium, platinum, and aluminum from scrap containing such metal values, said scrap including at least some organic combustible material, said process being performed under conditions resulting in substantially reduced emission of environmental pollutants, comprising:

feeding said noble-type-metal-value-containing scrap and a source of uncombined gaseous oxygen into a pool of a molten salt consisting of at least one alkali metal carbonate and up to 25 wt.% of an alkali metal sulfate at a temperature between 400° and 1,800°C to thermally decompose the scrap to form separable scrap decomposition products and said metal, said metal being in a finely divided elemental state dispersed in said bath, and separately recovering said metal free from said scrap decomposition products, the process being so controlled so that the final gaseous effluent vented to the atmosphere consists essentially only of gases selected from carbon dioxide, water vapor, oxygen, and nitrogen.

\* \* \* \* \*